US009535593B2

(12) United States Patent
Li et al.

(10) Patent No.: US 9,535,593 B2
(45) Date of Patent: Jan. 3, 2017

(54) ELECTRONIC DEVICES AND METHOD FOR CONTROLLING USER INTERFACE WITH FUNCTION-ENABLED AREA AND CURSOR

(71) Applicant: Acer Incorporated, New Taipei (TW)

(72) Inventors: Chien-Hung Li, New Taipei (TW); Yu-Hsuan Shen, New Taipei (TW); Yueh-Yarng Tsai, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 62 days.

(21) Appl. No.: 14/484,464

(22) Filed: Sep. 12, 2014

(65) Prior Publication Data

US 2015/0253919 A1    Sep. 10, 2015

(30) Foreign Application Priority Data

Mar. 5, 2014   (TW) .............................. 103107365 A

(51) Int. Cl.
*G06F 3/0484* (2013.01)
*G06F 3/0486* (2013.01)
*G06F 3/0488* (2013.01)

(52) U.S. Cl.
CPC ......... *G06F 3/0486* (2013.01); *G06F 3/04842* (2013.01); *G06F 3/04886* (2013.01); *G06F 2203/04803* (2013.01)

(58) Field of Classification Search
CPC .. G06F 3/04883; G06F 3/0416; G06F 3/0488; G06F 3/04842; G06F 3/04817
USPC ........................... 715/856, 863; 345/157–184
See application file for complete search history.

(56) References Cited

U.S. PATENT DOCUMENTS

| 8,754,855 | B2 | 6/2014 | Duncan et al. | |
|---|---|---|---|---|
| 8,826,181 | B2* | 9/2014 | Mouilleseaux | G06F 3/04883 715/834 |
| 2003/0007015 | A1* | 1/2003 | Laffey | G06F 3/04842 715/860 |
| 2010/0001967 | A1* | 1/2010 | Yoo | G06F 3/0488 345/173 |
| 2010/0073486 | A1* | 3/2010 | Tai | G06F 3/0338 348/207.1 |

(Continued)

FOREIGN PATENT DOCUMENTS

| TW | 201003468 A | 1/2010 |
|---|---|---|
| TW | 201339949 A | 10/2013 |
| TW | 201405414 A | 2/2014 |

OTHER PUBLICATIONS

TW Office Action dated Apr. 29, 2014 in corresponding Taiwan application (No. 103107365).

*Primary Examiner* — Larry Sternbane
(74) *Attorney, Agent, or Firm* — McClure, Qualey & Rodack, LLP

(57) ABSTRACT

The invention provides an electronic device including a display unit, a touch sensing module and a processing unit. The display unit displays a user interface. The user interface includes a function-enabled area and a cursor. The touch sensing module is arranged to sense a touching object corresponding to the touch event of the cursor. The processing unit is arranged to implement the user interface. The processing unit further enables a function of the function-enabled area when the touch event corresponds to an event in which the cursor is dragged into the function-enabled area and remains in the function-enabled area by pressing for a first predetermined period.

12 Claims, 8 Drawing Sheets

(56) References Cited

U.S. PATENT DOCUMENTS

2012/0098743 A1\* 4/2012 Lai ..................... G06F 3/0236
                                                    345/157
2015/0084866 A1   3/2015 Thomas et al.

\* cited by examiner

ELECTRONIC DEVICES AND METHOD FOR CONTROLLING USER INTERFACE WITH FUNCTION-ENABLED AREA AND CURSOR

CROSS REFERENCE TO RELATED APPLICATIONS

This Application claims priority of Taiwan Patent Application No. 103107365, filed on Mar. 5, 2014, the entirety of which is incorporated by reference herein.

BACKGROUND OF THE INVENTION

Field of the Invention

The application relates in general to an electronic device and a method for controlling a user-interface, and in particular to an electronic device and a user-interface controlling method for enabling a drag function by pressing a cursor in a specific area.

Description of the Related Art

These days, due to the rapid development electronic devices, the user can browse files and run applications with electronic devices used in daily life. When a user wants to enable some specific function of the operating system, such as changing the layout of the user interface, selecting a plurality of objects, or dragging objects, this function can only be achieved through complex input controls, like repeatedly pressing the touch screen or using multi-touch techniques. That might be inconvenient for the user. Thus, how to provide a better operation for the user in that situation is a problem which needs to be solved immediately.

BRIEF SUMMARY OF INVENTION

An embodiment of the invention provides an electronic device that includes a display unit, a touch sensing module and a processing unit. The display unit displays a user interface. The user interface includes a function-enabled area and a cursor. The touch sensing module is arranged to sense a touching object corresponding to the touch event of the cursor. The processing unit is arranged to implement the user interface. The processing unit further enables a function of the function-enabled area when the touch event corresponds to an event in which the cursor is dragged into the function-enabled area and is pressed, and subsequently remaines in the function-enabled area for a first predetermined period.

Another embodiment of the invention provides a method for controlling the user interface, which is adapted to an electronic device, the steps comprising: implementing a user interface comprising a function-enabled area and a cursor; sensing a touching object corresponding to the touch event of the cursor; and enabling a function corresponding to the function-enabled area when the touch event corresponds to an event in which the cursor is dragged into the function-enabled area, and subsequently remaines in the function-enabled area by pressing for a first predetermined period.

BRIEF DESCRIPTION OF DRAWINGS

The invention can be more fully understood by reading the subsequent detailed description and examples with references made to the accompanying drawings, wherein.

DETAILED DESCRIPTION OF INVENTION

Further areas in which of the present devices and methods can be applied will become apparent from the detailed description provided hereafter. It should be understood that the detailed description and specific examples, while indicating exemplary embodiments of the electronic devices and the methods for displaying user interface, are intended for purposes of illustration only and are not intended to limit the scope of the invention.

Figure 1:
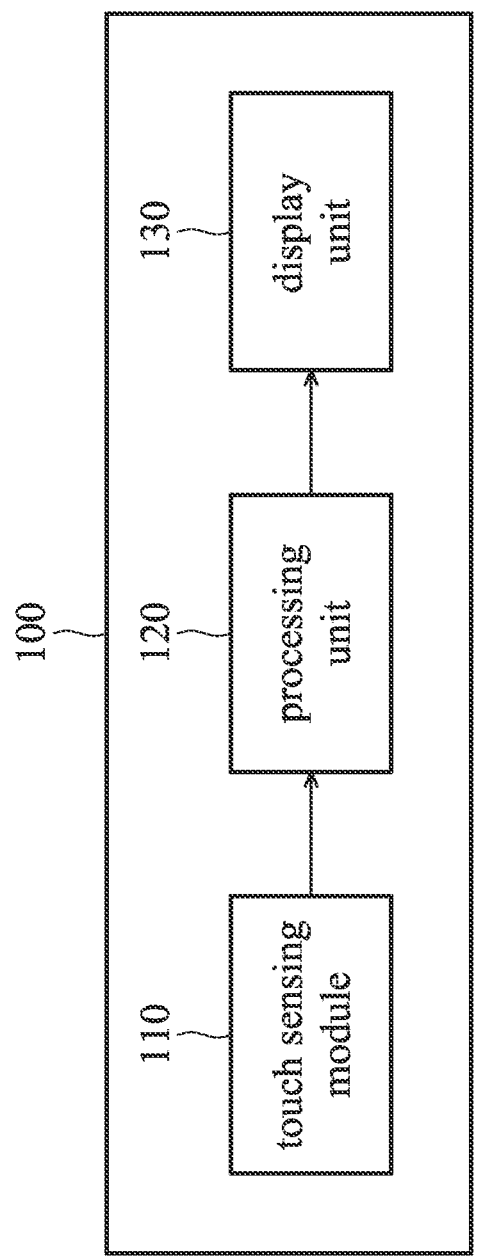
FIG. 1 is a block diagram of an electronic device in accordance with an embodiment of the invention.

FIG. 1 is a block diagram of an electronic device in accordance with an embodiment of the invention. As shown in FIG. 1, the electronic device 100 includes a touch sensing module 110, a processing unit 120, and a display unit 130. The electronic device 100 can be a personal digital assistant, mobile phone, smartphone, laptop, tablet PC, or game device. The touching object can be a finger of the user, stylus, or any object that can enable the touch sensing electrodes. The processing unit 120 is configured to implement the user interface, and enables a function corresponding to the function-enabled area according to a touch event. The user interface can be an application with a dragging function, such as the file browser application, the e-mail application, or the browser. The display unit 130 is arranged to display the user interface, and changes the arrangement of the user interface according to the function of the function-enabled area.

Figure 2A:
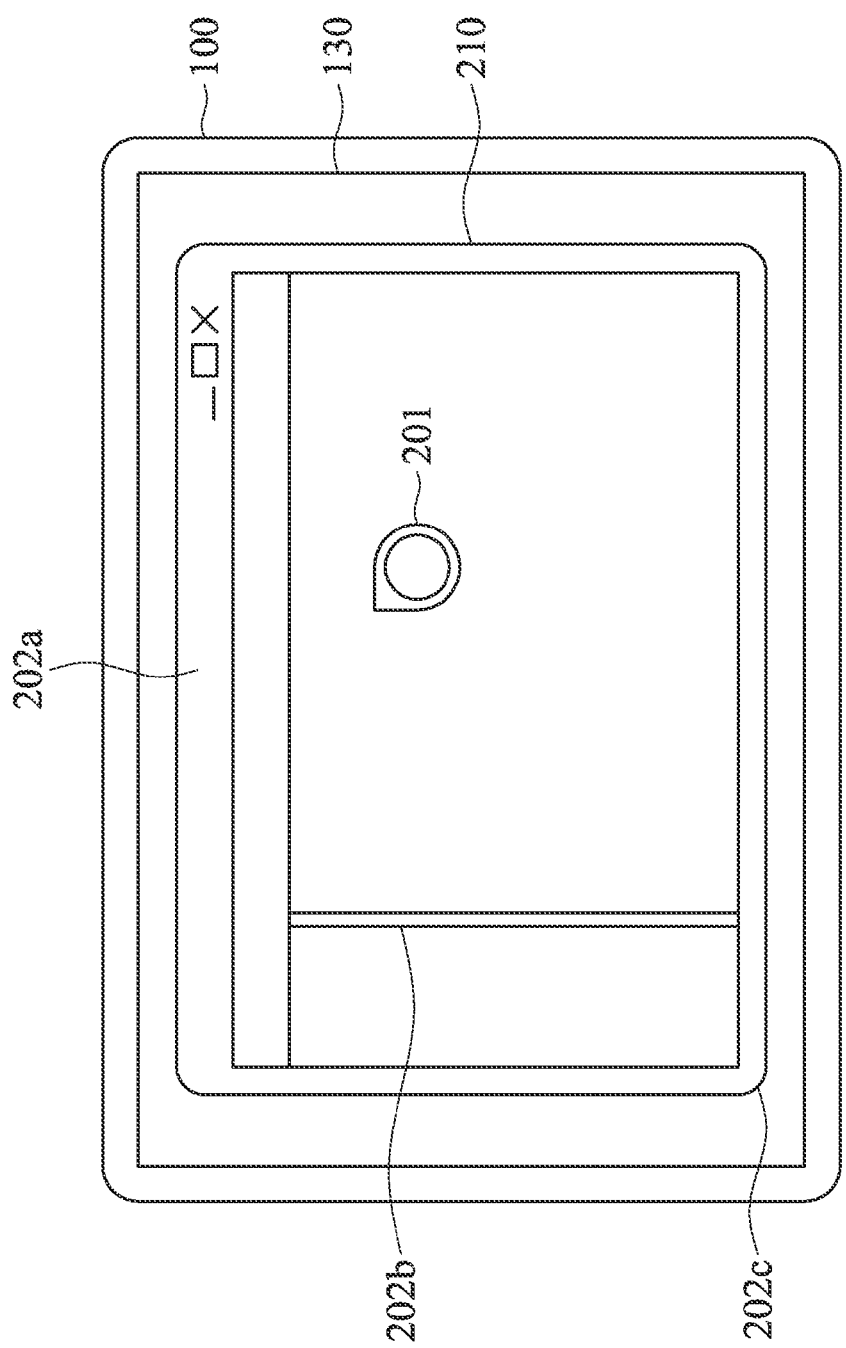
FIGS. 2A and 2B are schematic diagrams of an operations of a user interface in accordance with an embodiment of the invention.
Figure 2B:
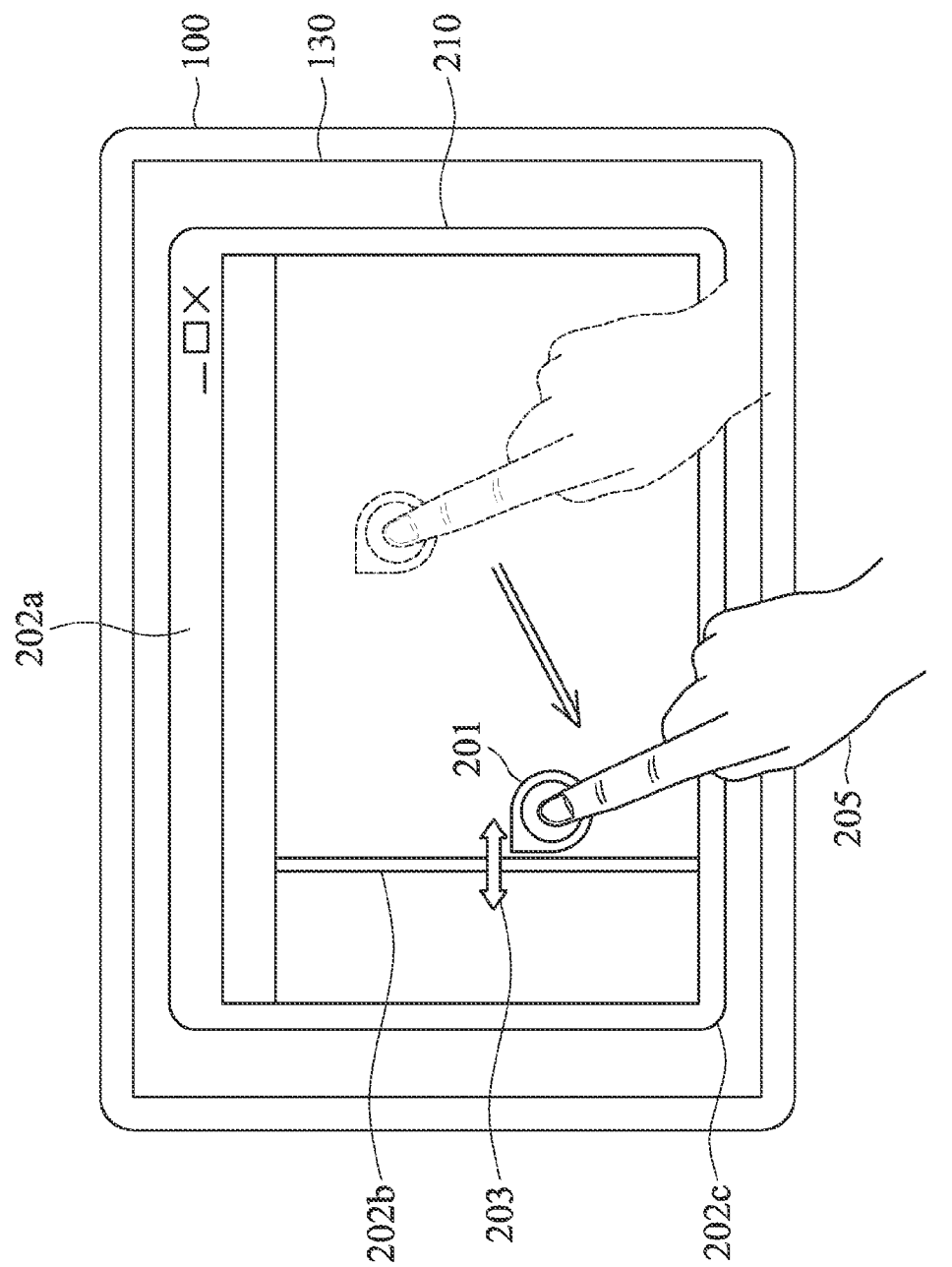

FIG. 2A and 2B are diagrams of the operation of a user interface in Accordance with another embodiment of the invention. As shown in FIG. 2, a file browser application 210 and a cursor 201 are displayed in the display unit 130. The file browser application 210 includes a function-enabled area 202a, a function-enabled area 202b, and a function-enabled area 202c. The function of the function-enabled area 202a is to change the position of the user interface, the function of the function-enabled area 202b is to adjust the width of the column, and the function of the function-enabled area 202c is to adjust the size of the user interface. It should be noted that the function of the function-enabled area can be to change the user interface with another dragging action, or to select a plurality of objects in the block by using the dragging action.

Please refer to FIG. 2B. As shown in FIG. 2B, when the touch sensing module 110 detects that the cursor 201 is pressed by the user's finger 205, and the cursor 201 is dragged into the function-enabled area 202b or the distance between the cursor 201 and the function-enabled area 202b is less than a second predetermined distance. For example, the distance is less than 5 pixels, an icon 203 which corresponds to the function of the function-enabled area 202b will be displayed to notify the user that the function can be enabled with the specific touch event. For example, in the embodiment, the icon corresponds to the function of adjusting the width of the column. Furthermore, when the distance between the cursor 201 and the function-enabled area 202b is greater than the second predetermined distance, the icon 203 will be disabled. It should be noted that the function-enabled area with different functions may correspond to the icon with different patterns. Then the touch sensing module 110 detects whether the cursor 201 remains in the function-enabled area 202b or in a predetermined area for more a predetermined period. For example, the area of 5 pixels * 5 pixels, for longer than a predetermined period, e.g. for more than 1 second. If the finger 205 presses the cursor 201 and remains in the function-enabled area 202b for more than 1 second, the processing unit 120 determines that the user wants to adjust the width of the column, and then enables the function of the function-enabled area 202b. However, in some situations, the finger 205 may shake slightly when touching the touch sensing screen, which causes the cursor 201 to move around. Therefore, the touch sensing module 110 further detects the speed of the cursor 201. If the speed of the cursor 201 is less than a predetermined speed, e.g. 5 pixels per second, the processing unit 120 determines that the movement of the cursor 201 is just the shaking of the finger 205, and then enables the function for adjusting the width of the column. The processing unit 120 disables the function described above, and displays the result of the adjustment when the user finishes the adjustment of the width of the column, and after the finger 205 leaves the touch sensing screen.

In some specific situations, a misjudgement on the part of the processing unit 120 may occur when the user moves the cursor 201 slowly through the function-enabled area as recited above. In accordance with an embodiment, the electronic device 100 further includes a storage unit (not shown) which is arranged to store the trajectory of the cursor 201, e.g., recording every 0.2 seconds. When the speed of the cursor 201 is slower than a predetermined speed, e.g., 5 pixels per second, the processing unit 120 further determines whether the previous displacement of the cursor 201 is greater than a predetermined value or not, such as whether the displacement for the past 2 second is larger than 5 pixels or not. If the previous displacement of the cursor 201 is greater than the predetermined value, it represents the movement of the cursor 201 being moved by the user at a slow speed rather than a shaking finger 205. Then, the period for determining whether the cursor 201 is stopping in any of the function-enabled areas or not is extended, to 2 seconds for example. The function of the function-enabled area is enabled when the finger 205 presses the cursor 201 and stops in the function-enabled area 202b for longer than 2 seconds for reducing the probability of misjudgment.

Figure 3A:
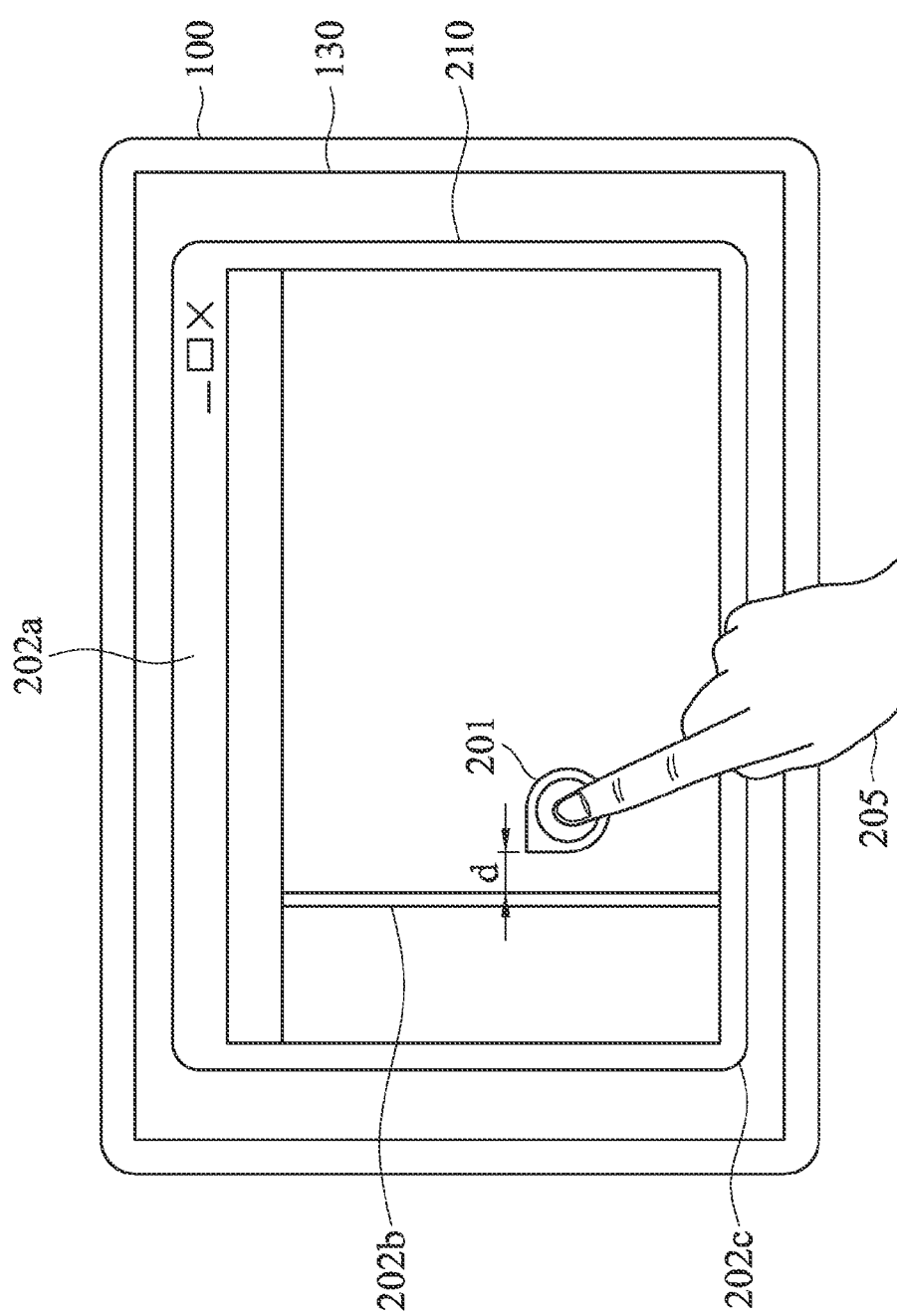
FIGS. 3A and 3B are schematic diagrams of operations of a user interface in accordance with another embodiment of the invention.
Figure 3B:
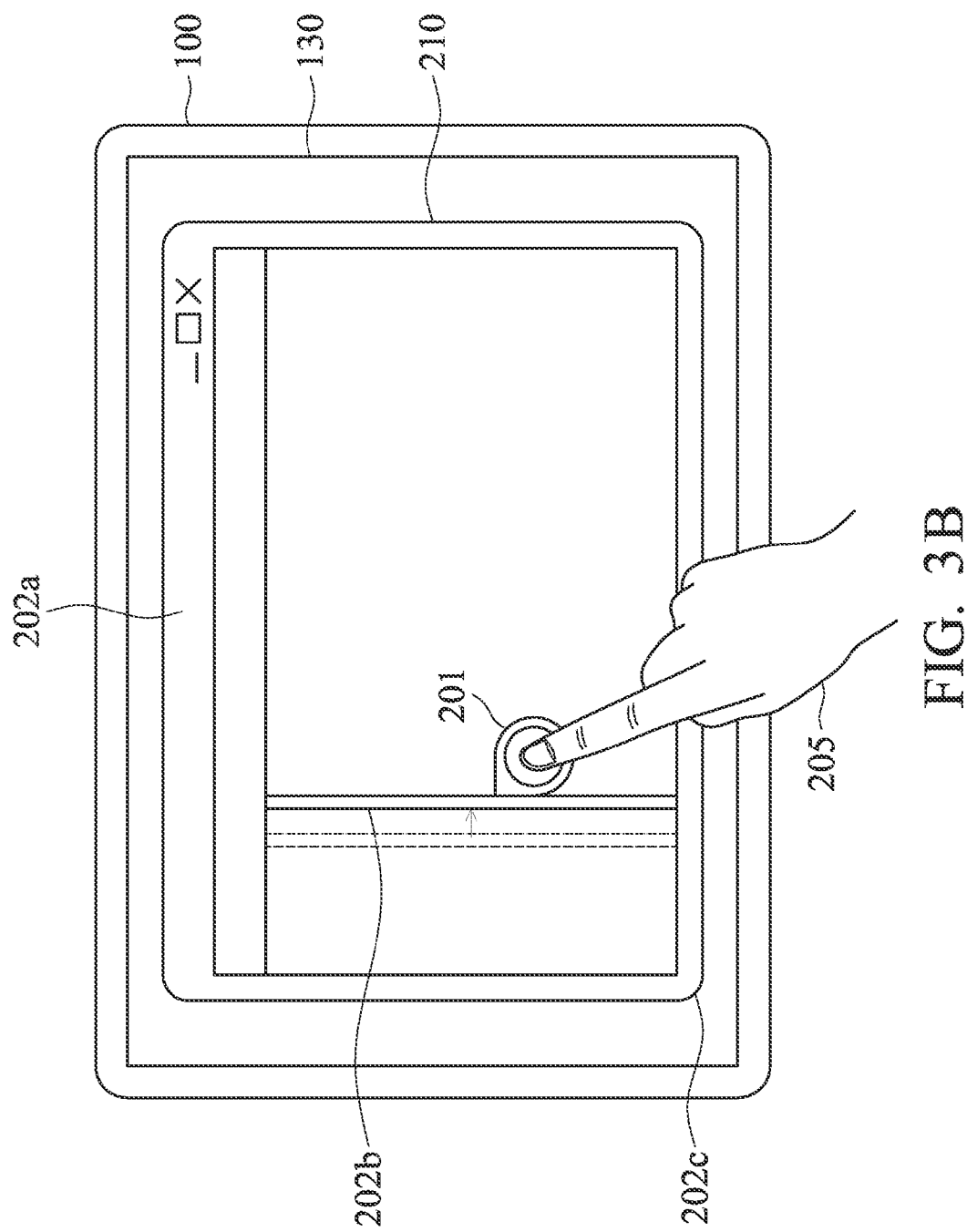

Please refer to FIGS. 3A and 3B. According to another embodiment of the invention, the boundary of the column is adjusted to a position corresponding to the position of the cursor 201 by the processing unit 120 when the cursor 201 is moved by the finger 205 to a position that is away from the function-enabled area 202b, the distance between the position of the finger 205 and the function-enabled area 202b is less than a first predetermined distance, e.g., less than 10 pixels, and the cursor 201 is pressed for more than 1 second within a predetermined area, e.g., the area of 5 pixels * 5 pixels. Furthermore, the user can drag the cursor 201 continuously to adjust the boundary of the column to a predetermined size after it is adjusted to the position corresponding to the position of the cursor 201, and the operation of the adjustment is ended after the finger is removed the finger 205 from the touch sensing screen. In other words, the column can be adjusted to a predetermined size by approaching to the function-enabled area 202b when the user wants to adjust the size of the column.

Figure 4A:
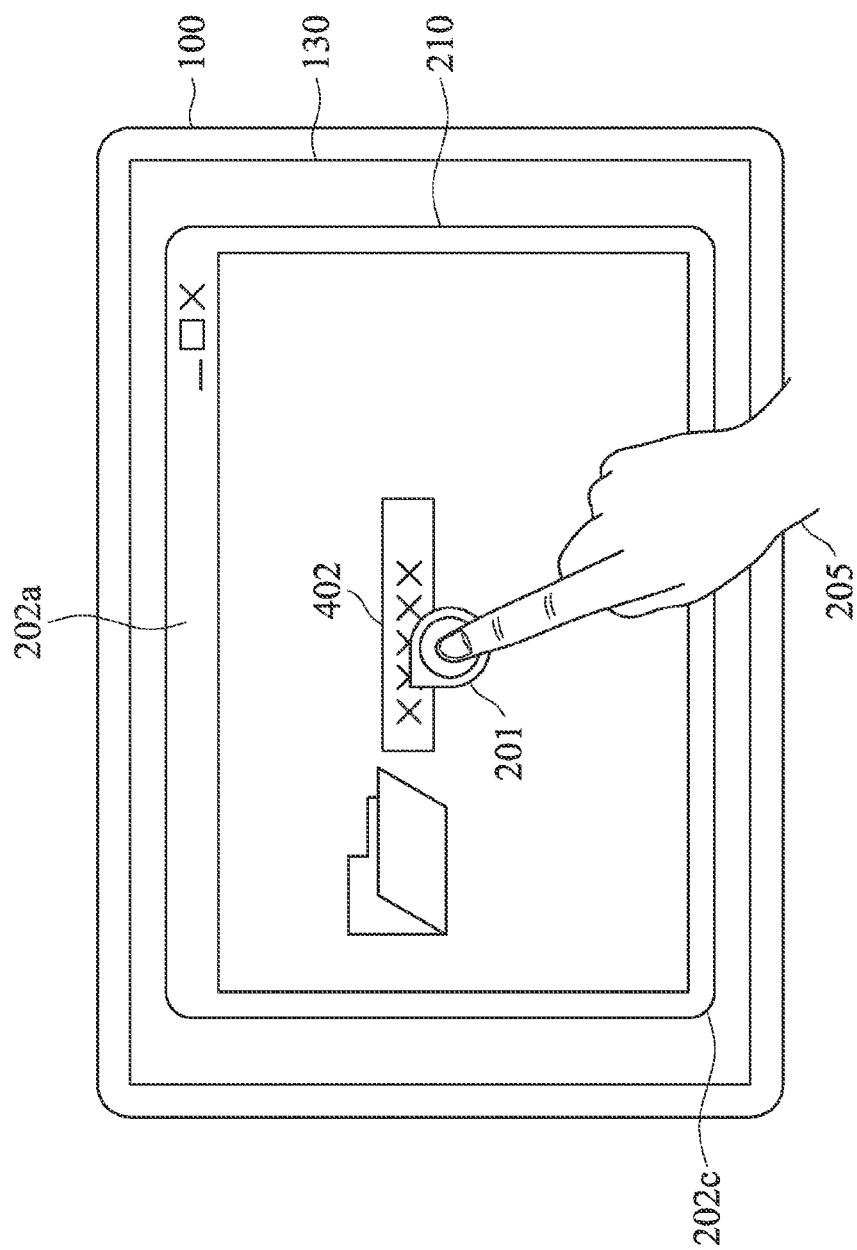
FIGS. 4A and 4B are schematic diagrams of operations of a user interface in accordance with another embodiment of the invention.
Figure 4B:
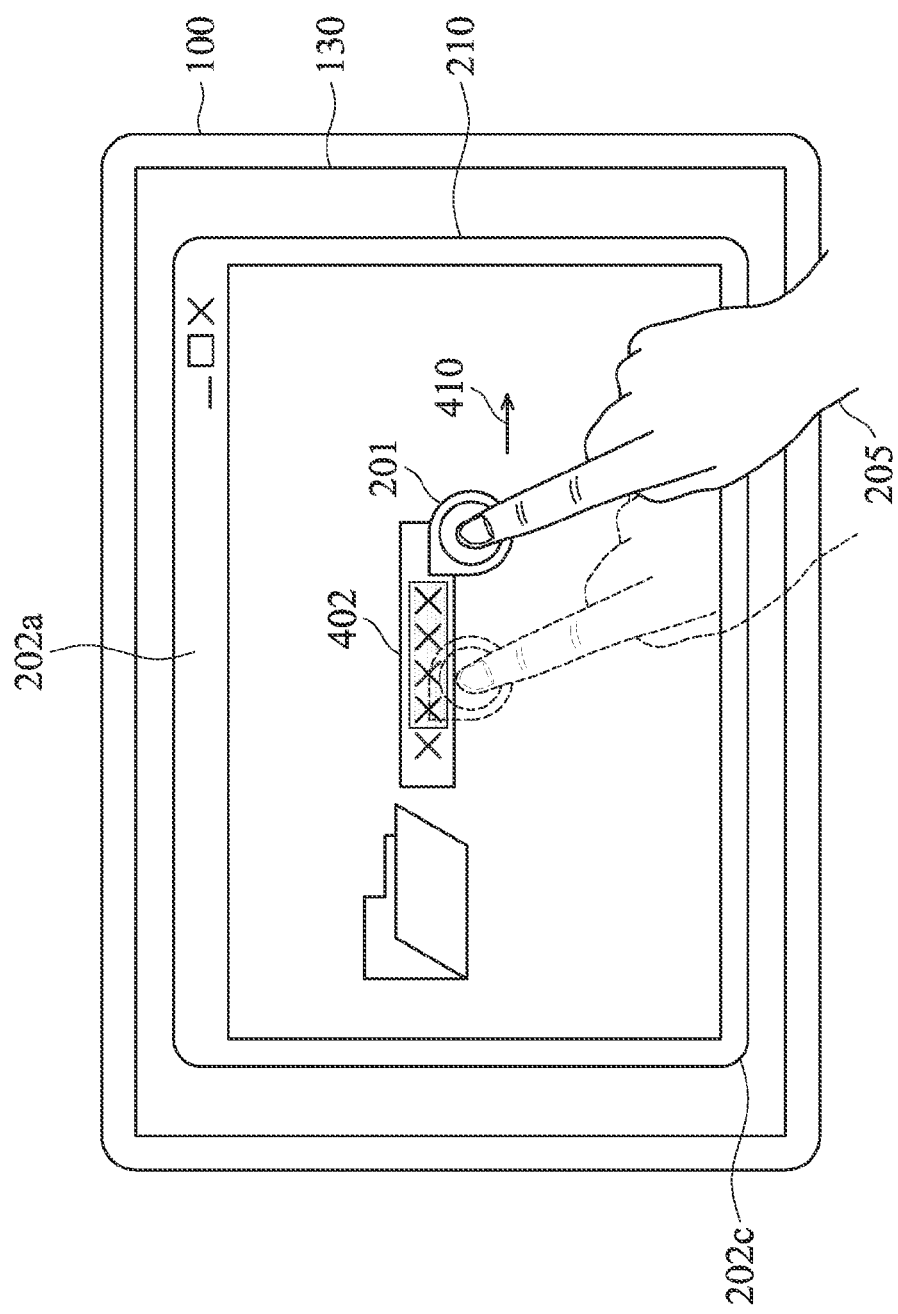

Please refer to FIG. 4A and 4B. As shown in FIG. 4A, according to another embodiment of the present invention, when the function-enabled area 402 is a text block, the function for selecting the words can be enabled by moving the cursor 201 to the function-enabled area 402 and pressing the cursor 201 when it is between two characters for longer than 1 second. Then, the processing unit 120 chooses the characters according to the direction 410 of the cursor 201.

Figure 5:
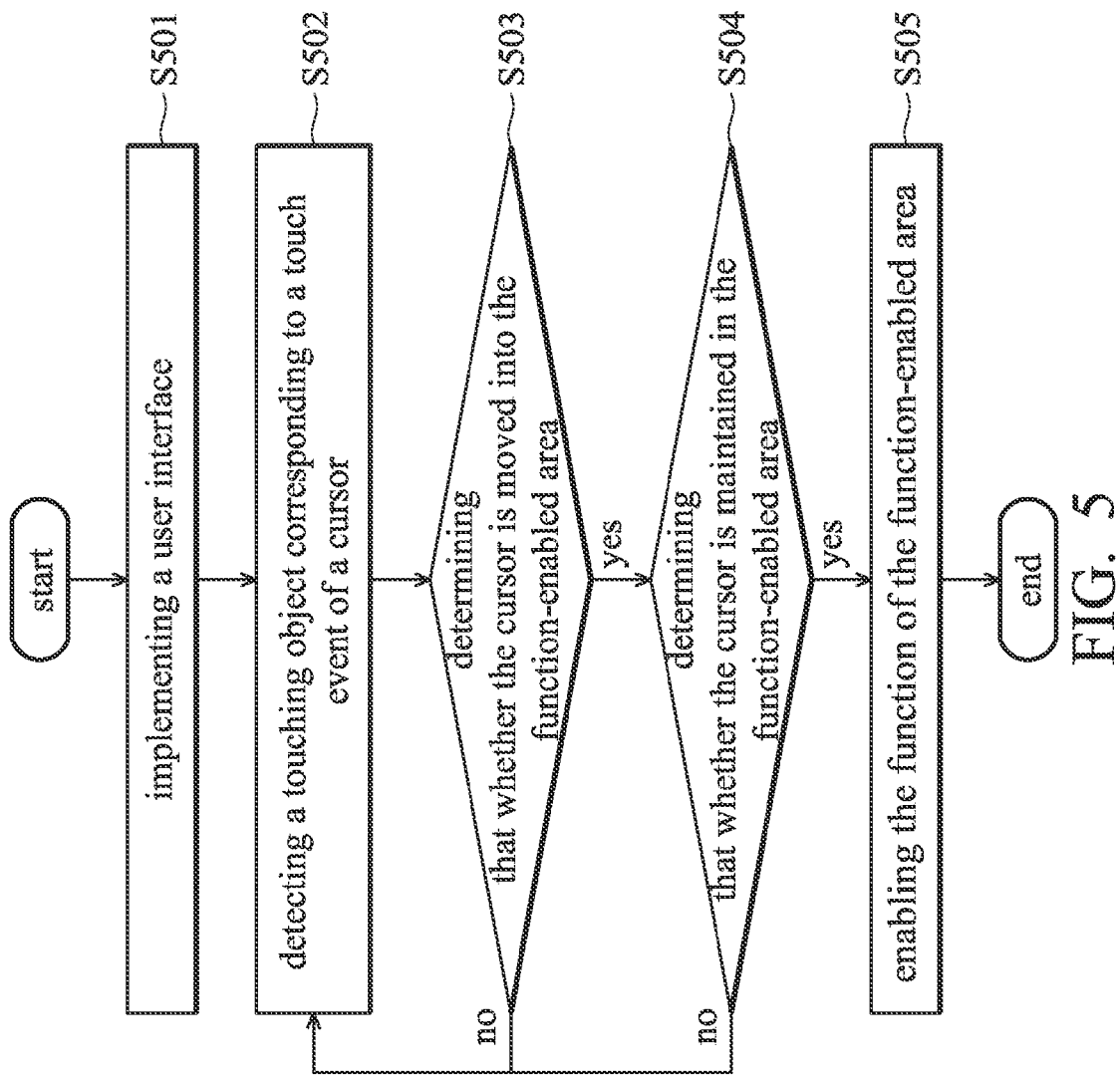
FIG. 5 is a flow chart of a method for controlling a user interface in accordance with an embodiment of the invention.

Please refer to FIG. 5 with FIG. 1. FIG. 5 is a flow chart of a method for controlling the user interface in accordance with an embodiment of the invention. In step S501, the user executes a user interface. The user interface includes a function-enabled area and a cursor, and the user interface can be any application with a dragging function. The function of the function-enabled area can be the function of changing the position of the user interface, adjusting the width of the column, or adjusting the size of the user interface, but it is not limited to the description above. In step S502, the touch sensing module 110 detects that a cursor is touched and dragged by a touching object. The touching object can be a finger of the user, stylus, or any object that can enable the touch sensing electrodes. The icon 203 corresponding to the function of the function-enabled area will be disabled when the cursor is moved into the function-enabled area or the distance between the cursor and the function-enabled area is smaller than the predetermined distance. The function-enabled area with different functions may correspond to the icon with different patterns. Then, in step S503, the processing unit 120 further determines that whether the cursor is moved into the function-enabled area. When the cursor is maintained in the function-enabled area, the method proceeds to step S504, in which the processing unit 120 further determines whether the cursor is pressed for a predetermined period and remains in the function-enabled area or has not moved over a predetermined area. When the cursor remains in the function-enabled area for the predetermined period, the method proceeds to step S504, in which the processing unit 120 determines that the user wants to change the layout of the user interface, and then enables the function of the function-enabled area (step S505).

As described above, an embodiment of the invention provides an electronic device and a method for controlling the user interface. The user can enable a dragging function by leaving a finger in the area with a dragging function for a period of time rather than lifting the finger and pressing the cursor again. That helps the user to operate the user interface more directly, and the experience for the user is improved.

It will be apparent to those skilled in the art that various modifications and variations can be made to the structure disclosed without departing from the scope or spirit of the invention. In view of the foregoing, it is intended that the present invention covers modifications and variations of this invention, provided they fall within the scope of the following claims and their equivalents.

What is claimed is:
1. An electronic device, comprising:
 a display unit, displaying a user interface, wherein the user interface includes a function-enabled area and a cursor;
 a touch-sensing module, sensing a touch event of a touching object corresponding to the cursor and detecting a speed of the cursor;
 a processing unit, generating the user interface, wherein when the touching event corresponds to an event in which the cursor is dragged into the function-enabled area, and the cursor is pressed and stayed in the function-enabled area for more than a first predetermined period, the processing unit enables a function corresponding to the function-enabled area;

wherein the processing unit further enables the function of the function-enabled area when the speed is slower than a predetermined speed and the cursor is pressed for a second predetermined period and moved in a predetermined range.

2. The electronic device as claimed in claim 1, wherein after enabling the function of the function-enabled area, the function of the function-enabled area is disabled when the touch sensing module detects that the touching object has lifted the cursor.

3. The electronic device as claimed in claim 1, wherein the second predetermined period is longer than the first predetermined period.

4. The electronic device as claimed in claim 1, wherein the function of the function-enabled area is enabled for changing the arrangement of the user interface when the touching event is corresponding to the event of dragging the cursor, and the distance between the cursor and the function-enabled area is smaller than a first predetermined distance, and the cursor is pressed and stayed in a predetermined range for the first predetermined period.

5. The electronic device as claimed in claim 1, wherein a function for selecting characters is enabled when the function-enabled area is a text block, and the cursor is pressed for the first predetermined period, and after enabling the function for selecting characters, the characters are selected according to a moving direction of the cursor.

6. The electronic device as claimed in claim 1, wherein an icon corresponding to the function-enabled area is displayed when a distance between the cursor and the function-enabled area is smaller than a second predetermined distance.

7. A method for controlling a user interface, adapted to an electronic device, comprising:
   implementing a user interface comprising a function-enabled area and a cursor;
   sensing a touching object corresponding to the touch event of the cursor;
   detecting a speed of the cursor; and
   enabling a function corresponding to the function-enabled area when the touch event is corresponded to event that the cursor is dragged into the function-enabled area, and the cursor is pressed and stayed in the function-enabled area for more than a first predetermined period;
   wherein the function of the function-enabled area is further enabled when the speed is slower than a predetermined speed and the cursor is pressed for a second predetermined period and moved in a predetermined range.

8. The method as claimed in claim 7, wherein after enabling the function of the function-enabled area, the function of the function-enabled area is disabled when a touch sensing module detects that the touching object has lifted the cursor.

9. The method as claimed in claim 7, wherein the second predetermined period is longer than the first predetermined period.

10. The method as claimed in claim 7, wherein the function of the function-enabled area is enabled for changing the arrangement of the user interface when the touching event is corresponding to the event of dragging the cursor, and the distance between the cursor and the function-enabled area is smaller than a first predetermined distance, and the cursor is pressed for the first predetermined period to stay in a predetermined range.

11. The method as claimed in claim 7, wherein a function for selecting characters is enabled when the function-enabled area is a text block, and the cursor is pressed for the first predetermined period, and after enabling the function for selecting characters, the characters are selected according to a moving direction of the cursor.

12. The method as claimed in claim 7, wherein an icon corresponding to the function-enabled area is displayed when a distance between the cursor and the function-enabled area is smaller than a second predetermined distance.

\* \* \* \* \*